United States Patent Office

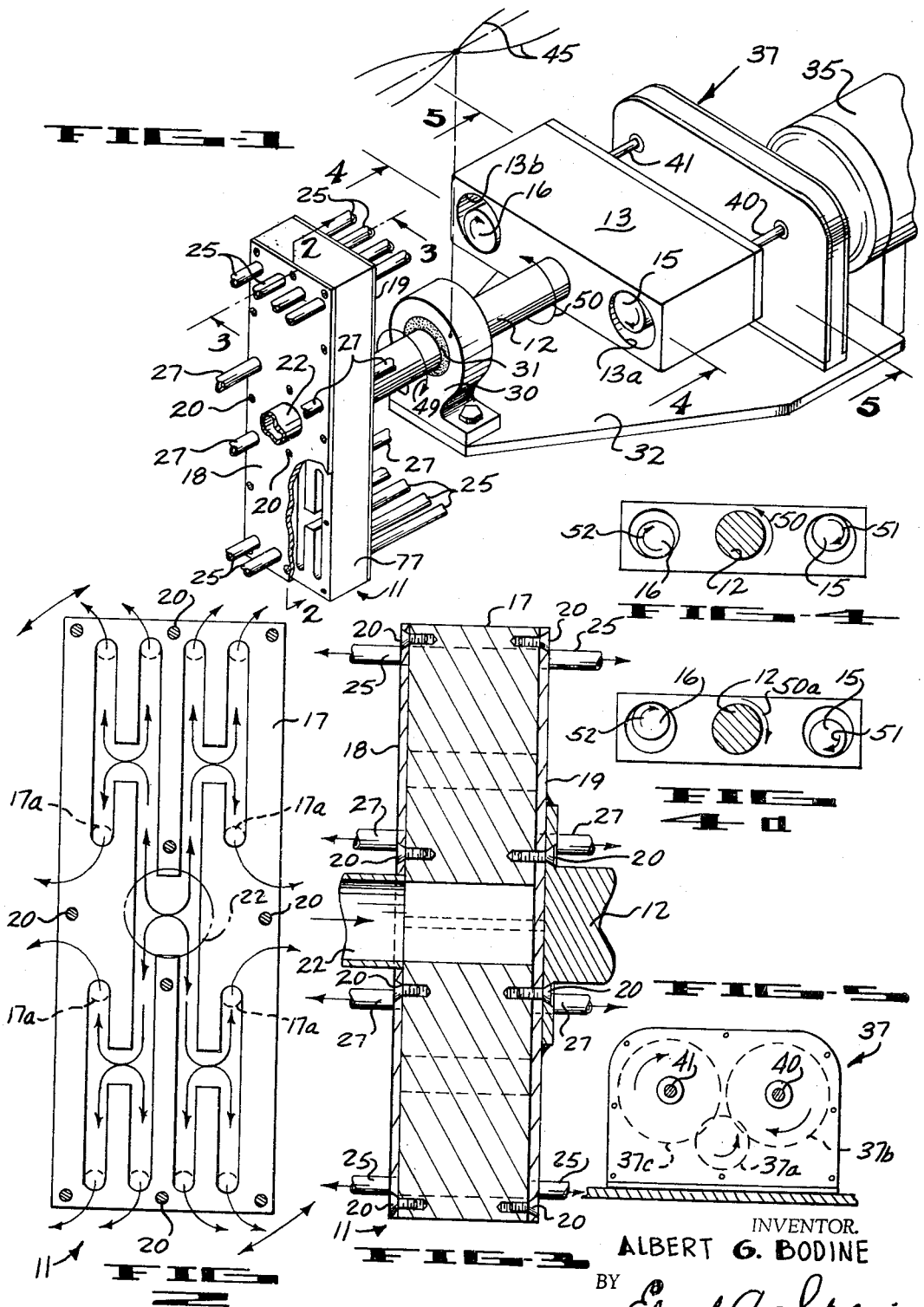

3,505,214
Patented Apr. 7, 1970

3,505,214
SONIC SEPARATOR
Albert G. Bodine, 7877 Woodley Ave.,
Van Nuys, Calif. 91406
Filed Dec. 6, 1966, Ser. No. 599,549
Int. Cl. B01d 35/20
U.S. Cl. 210—19                                    11 Claims

ABSTRACT OF THE DISCLOSURE

The fluid to be separated is fed into a separation chamber which is torsionally vibrated at a sonic frequency, the fluid material being incorporated as mass reactance in the vibration system. The heavier and lighter elements of the mixture each react differently to the vibrational sonic energy such that they tend to form into separate masses, the centrifugal force produced by the torsional sonic energy driving the heavier material to outlets near the periphery of the chamber and the lighter material to outlets closer to the center of the chamber.

---

The separation of the components of fluid mixtures is generally accomplished by means of a centrifuge which spins at relatively high speed, the centrifugal force driving the heavier components to the periphery of the spinning member, with the lighter components remaining closer to the center thereof. Separator devices of the prior art have several shortcomings. Firstly, where relatively high-viscosity fluids are involved, difficulties are often encountered in getting the separated fluid material to migrate to the desired collection points. Further, most prior art separators are not readily adaptable to a continuous flow-through process, necessitating that separation be accomplished in a batch-type operation. This limits the utilization of the equipment and the speed of the processing. Also, high-speed centrifuges are limited in their size by design considerations and often present spin-bearing maintenance problems. There are also certain mixtures and emulsions which it is extremely difficult or impossible to separate with centrifuge-type separators of the prior art.

The device of this invention overcomes the aforementioned shortcomings by utilizing a unique separation chamber which is torsionally vibrated to and fro at a sonic frequency, the fluid material being incorporated into the vibration system as a component part thereof. The lighter and heavier components of the mixture react differently to the sonic energy and thus tend to aggregate in separate masses to achieve separation effects heretofore difficult or impossible of attainment. Centrifugal force is also generated by the torsional vibrational system to drive the heavier components to the periphery of the separation chamber while the lighter components remain closer to the center. The vibrational system is preferably made to operate resonantly so that extremely high accelerations are generated which operate both to separate out the components of the fluid and to give it a fluidity which facilitates the migration thereof to the exit apertures of the separation chamber. A relatively small angle of rotational movement of the separation chamber is required to ahieve the desired end results, thus obviating the inherent size limitations imposed in the design of prior art centrifuge-type separators as well as the spin-bearing problems thereof. Further, in view of the elimination of the necessity for spinning the separation chamber, the device of this invention is readily adapted to a continuous flow-through-type operation which assures maximum utilization of the equipment and lends itself to relatively high-speed processing. Further, in view of the mass reactance vibrational separation effects on the fluid by virtue of its incorporation into the vibration system and by virtue of the extremely high acceleration attained in the resonantly vibrating system, it is possible to separate mixtures or emulsions which heretofore it has been difficult or impossible to separate with prior art mechanical separator devices.

The device of this invention utilizes a separator chamber which has a labyrinth structure formed therein. Fluid to be separated is fed into the central portion of the chamber through a relatively large inlet while the separated heavier and lighter components are respectively removed from the chamber through a first group of relatively small outlets located near the periphery of the chamber and a second group of relatively small outlets located between the first group of outlets and the inlet.

Attached to the separation chamber is one end of an elastic bar member, the other end of such bar member being connected to a torsional vibration generator which may include a pair of orbiting mass oscillators phased with respect to each other and connected to the bar so as to excite such bar with a to and fro elastic torsional vibration. The bar, the separator chamber and the fluid in the chamber form part of a resonant elastic vibrational system with the elastic bar coupling such energy from the oscillator to the chamber.

It is therefore an object of this invention to provide an improved device for separating the components of a fluid mixture.

It is a further object of this invention to provide means for utilizing sonic energy to separate the components of a fluid mixture more effectively by incorporating such fluids into a resonant elastic torsional vibration system.

It is still another object of this invention to enable the more rapid separation of the components of a fluid mixture.

It is still a further object of this invention to enable the highly efficient separation of the components of a fluid mixture in a continuous flow-through-type operation.

It is still another object of this invention to provide means for separating the components of a fluid mixture having greater economy of both construction and utilization than prior art devices.

It is still another object of this invention to provide means for separating the components of a fluid mixture in which the migration capability of the fluid is enhanced to facilitate its efficient passage through and out of the separation chamber.

Other objects of this invention will become apparent from the following description taken in connection with the accompanying drawings, of which:

FIG. 1 is a perspective view of a preferred embodiment of the device of the invention;

FIG. 2 is a view taken along the plane indicated by 2—2 in FIG. 1;

FIG. 3 is a cross-sectional view taken along the plane indicated by 3—3 in FIG. 1;

FIG. 4 is a view taken along the plane indicated by 4—4 in FIG. 1;

FIG. 4a is a view similar to FIG. 4 for illustrating the portion of the torsional vibrational cycle 180° removed from that illustrated in FIG. 4; and FIG. 5 is a view taken along the plane indicated by 5—5 in FIG. 1.

It has been found most helpful in analyzing the operation of the device of this invention to analogize the acoustically vibrating circuit involved to an equivalent electrical circuit. This sort of approach to analysis is well known to those skilled in the art and is described, for example, in chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R, and mechanical impedance $Z_m$ is equated with electrical impedance $Z_e$.

Thus, it can be shown that if a member is elastically vibrated by means of an acoustical sinusoidal force $$F_o \sin \omega t$$

($\omega$ being equal to $2\pi$ times the frequency of vibration), that $$Z_m = R_m + j\left(\omega M - \frac{1}{\omega C_m}\right) = \frac{F_o \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is most efficiently utilized.

It is to be noted that in the device of this invention the fluid material to be separated forms part of the mass in the resonant vibration system such that the lighter and heavier components form into separate reactive elements in such system. Thus, the separation action is accomplished by incorporating the fluid material directly into the resonant vibration system itself, rather than coupling it to such system as only a resistive impedance load.

It is important to note the significance of the attainment of high acoustical Q in the resonant system being driven, to increase the efficiency of the vibration thereof and to provide a maximum amount of energy for the separating operation. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high amplitude vibration by minimizing the effect of friction in the circuit and/or maximizing the effect of mass in such circuit.

Of significance in the implementation of the method and devices of this invention is the high acceleration of the components of the elastic resonant system that can be achieved at sonic frequencies. The acceleration of a vibrating mass is a function of the square of the frequency of the drive signal times the amplitude of vibration. This can be shown as follows:

The instantaneous displacement $y$ of a sinusoidally vibrating mass can be represented by the following equation:

$$y = Y \cos \omega t \quad (2)$$

where Y is the maximum displacement in the vibration cycle and $\omega$ is equal to $2\pi f$, $f$ being the frequency of vibration.

The acceleration $a$ of the mass can be obtained by differentiating Equation 2 twice, as follows:

$$a = \frac{d^2 y}{dt^2} = -Y\omega^2 \cos(\omega t) \quad (3)$$

The acceleration $a$ thus is a function of Y times $(2\pi f)^2$. At resonance, Y is at a maximum and thus even at moderately high sonic frequencies, the material to be separated is subjected to very high accelerations making for highly effective separating action.

In considering the significance of the parameters described in connection with Equation 1, it should be kept in mind that the total effective resistance, mass, and compliance in the acoustically vibrating circuit are represented in the equation and that these parameters may be distributed throughout the system rather than being lumped in any one component or portion thereof.

It is also to be noted that an orbiting-mass oscillator may be utilized in the device of the invention that automatically adjusts its output frequency to maintain resonance with changes in operating conditions. Thus, in the face of changes in the effective mass and compliance presented by the system during process operation, such system automatically is maintained in optimum resonant operation by virtue of the "lock-in" characteristics of applicant's unique orbiting-mass oscillator. In addition, the orbiting-mass oscillator automatically changes not only its frequency but its phase angle and therefore its power factor with changes in the resistive impedance presented, to assure optimum efficiency of operation at all times.

Referring now to the drawings, a preferred embodiment of the device of the invention is illustrated. Separation chamber 11 is attached to one end of elastic bar member 12, the other end of the elastic bar member being attached to rectangular member 13 which forms a housing for orbiting-mass oscillator rotors 15 and 16. Chamber 11 and housing member 13 form balanced lever arms at the opposite ends of elastic bar member 12. The chamber and housing, while shown in rectangular form, may be of any other balanced geometric shape such as full circles or squares, etc. Separation chamber 11 comprises a core portion 17 having a plurality of passageways therein forming a labyrinth. Labyrinth core portion 17 is enclosed by means of cover plates 18 and 19 which are held to the central portion by means of machine screws 20. Flexible tubular lines 22, 25 and 27 provide fluid communication through cover plates 18 and 19 to the interior of chamber 11, line 22 being utilized for carrying the material to be separated into the chamber while lines 25 and 27 are respectively utilized to carry the separated heavier and lighter components of material from the chamber. It is to be noted that line 22 has a substantially larger diameter than lines 25 and 27, this to enable the fluid in the chamber to be maintained under pressure. Such pressurization is necessary to prevent sonic cavitation of the fluid and to assure that it is maintained in intimate contact with the walls of the chamber so that the fluid will effectively integrate with the vibration system.

Bar member 12 is supported near the central portion thereof on support member 30, which has a resilient bushing 31, which may be of rubber, for vibrationally isolating the bar member from the support member. Support member 30 is mounted on base plate 32.

Orbiting-mass oscillator rotors 15 and 16, which are cylindrical in form and are preferably of a solid relatively heavy material such as steel, are rotatably driven in the same direction around races 13a and 13b formed in housing 13, by means of motor 35. The oscillators formed by rotors 15 and 16 may be of the type described in connection with FIGS. 21–23 of my Patent No. 2,960,314, issued Nov. 15, 1960. Motor 35 is coupled to rotors 15 and 16 through gear train 37 which includes a gear member 37a driven by the output shaft (not shown) of the motor which in turn drives gear members 37b and 37c. Gear members 37b and 37c are connected to flexible shafts 40 and 41, respectively, which in turn are respectively connected to rotors 15 and 16. Gear train 37 is supported on base 32 while oscillator housing member 13 is supported on bar member 12.

In the operation of the device of the invention, the liquid mixture to be separated is fed into separation chamber 11 through line 22. The speed of rotation of motor 35 is adjusted to cause resonant vibration of the vibration system including oscillator housing 13, bar member 12, chamber 11 and the fluid contained within the chamber. Such resonant vibration is evidenced by torsional standing wave vibration of bar member 12 such as indicated by graph lines 45 (FIG. 1), with a vibrational node appearing at the center of the bar where support member 30 is located, and the bar torsionally vibrating in opposite directions on either side of this node portion as indicated by arrows 49 and 50. In order to achieve such torsional vibration it is necessary that rotors 15 and 16 be rotationally 180° out of phase with each other at all times, as shown in FIGS. 1, 4 and 4a. Under such circumstances, all but the torsional vibrational components generated by the rotors effectively cancel each other out.

Let us now refer to FIGS. 4 and 4a to observe how the torsional vibrational signal is generated. With rotors 15 and 16 as illustrated in FIG. 4, such rotors being rotated in the same direction as indicated by arrows 51 and 52, respectively, a torsional couple is produced on bar member 12 as indicated by arrow 50. 180° later in the rotational cycle, as indicated in FIG. 4a, rotors 15 and 16 produce a rotational couple 50a on the bar member which is opposite to that shown in FIG. 4. Thus, bar member 12 is alternately twisted in opposite directions at a sonic vibration frequency.

Sonic energy has two basic effects in achieving the separating action in the separation chamber. Firstly, the fluid material is caused to vibrate as part of the resonant vibration system with like density components combining and heavier and lighter components separating from each other in view of the fact that like components react similarly to the sonic energy and thus tend to so move together in response to the vibrational energy. Secondly, a high centrifugal force is developed by the high-acceleration resonant vibration system, this centrifugal force tending to drive the heavier components of the fluid out to the extremities of the chamber with the lighter components remaining closer to the center thereof. The vibrational energy also tends to give the fluid a good migration capability which facilitates the movement of the fluid to the proper exit ports.

The labyrinth structure of chamber 17, as can best be seen in FIG. 2, lengthens the path through which the fluid must travel before the exit ports 17a for the lighter components thereof are reached. This assures that the fluid will be amply subjected to the sonic energy to provide proper separation of the components thereof.

The device of this invention thus enables the utilization of sonic energy to achieve highly efficient separation of the components of fluid material in a continuous feed-through-type process. Such fluid material is incorporated into a resonant vibration circuit wherein the separation process is achieved with the heavier and lighter separated components then being driven to appropriate exit ports by virtue of the centrifugal force generated.

I claim:

1. A sonic separator for separating the heavier and lighter components of a fluid mixture comprising:
   a separator chamber;
   an elastic bar member connected at one end thereof to said chamber;
   orbiting-mass oscillator means connected to the other end of said bar member for torsionally vibrating said bar member at a sonic frequency;
   means for feeding the fluid mixture to be separated into the central portion of said chamber; and
   means for removing the separated heavier and lighter components of said mixture from said chamber.

2. The separator as recited in claim 1 wherein the fluid mixture, the bar member and the chamber form a resonant vibration system at the output frequency of said oscillator means.

3. The separator as recited in claim 1 wherein the interior of said chamber has a labyrinth structure for increasing the length of the path through which the fluid must travel in the chamber.

4. The separator as recited in claim 1 and further including means for maintaining the fluid in said chamber under sufficient pressure to prevent cavitation thereof and to maintain said fluid in intimate contact with the walls of said chamber.

5. The separator as recited in claim 1 wherein said orbiting-mass oscillator means comprises a housing member attached to said bar member and rotor means mounted in said housing member for torsionally vibrating said housing member, and means for rotatably driving both of said rotor means in the same direction, said housing member and said separator chamber forming balanced lever arms at the opposite ends of said bar member.

6. A sonic separator for separating the heavier and lighter components of a fluid mixture comprising:
   a separation chamber;
   means for feeding the fluid mixture to be separated to the central portion of said chamber;
   means for removing the heavier and lighter components of the mixture from said chamber, said means providing separate fluid communications to the interior of said chamber at a point near the periphery thereof and at a point between said center portion and said periphery;
   an elastic bar member, said bar member being coupled at one end thereof to said chamber; and
   means for torsionally vibrating the end of said bar member opposite said one end thereof at a resonant sonic frequency;
   said fluid mixture being vibrationally driven as a mass reactive component of a resonant vibration system including said chamber and said bar.

7. The separator as recited in claim 6 wherein said chamber has a labyrinth structure in the interior thereof for increasing the distance of travel of the fluid in said chamber.

8. The separator as recited in claim 6 wherein said means for torsionally vibrating the end of said bar member comprises an orbiting-mass oscillator and means for rotatably driving said oscillator.

9. The separator as recited in claim 8 wherein said orbiting-mass oscillator comprises a housing member attached to said elastic bar member and a pair of eccentric rotor members mounted in said housing member on opposite sides of the longitudinal axis of said bar member, said oscillator driving means being adapted to drive said rotor members in the same direction in 180° phase relationship with each other.

10. The separator as recited in claim 6 and further including means for maintaining the fluid in said chamber under sufficient pressure to prevent cavitation thereof and to maintain said fluid against the walls of said chamber.

11. A method for separating the heavier and lighter components of a fluid mixture comprising the steps of:
   feeding the fluid mixture into a separation chamber, said fluid mixture being held in said chamber under pressure against the walls of the chamber;
   torsionally mechanically vibrating said chamber at a resonant sonic frequency, the fluid and the chamber forming part of a resonant vibration system; and
   while said chamber is being resonantly vibrated, removing the heavier and lighter components of the mixture from separate portions of the chamber.

References Cited

UNITED STATES PATENTS

| | | | |
|---|---|---|---|
| 2,420,687 | 5/1947 | Small | 204—307 X |
| 2,960,314 | 11/1960 | Bodine | 257—73 |
| 3,344,984 | 10/1967 | Kopczynski | 233—21 |

REUBEN FRIEDMAN, Primary Examiner

F. A. SPEAR, JR., Assistant Examiner

U.S. Cl. X.R.

210—512; 233—5, 21